United States Patent
Kirchheim et al.

(10) Patent No.: US 8,733,181 B2
(45) Date of Patent: May 27, 2014

(54) ELECTROMECHANICAL JOINING MODULE HAVING A FORCE TRANSDUCER

(75) Inventors: Andreas Kirchheim, Pfungen (CH); Jochen Schneider, Schorndorf (DE); Daniel Otter, Bruetten (CH); Georges Schaffner, Hittnau (CH); Rolf Thiel, Winterthur (CH)

(73) Assignee: Kistler Holding AG, Winterthur (CH)

( * ) Notice: Subject to any disclaimer, the term of this patent is extended or adjusted under 35 U.S.C. 154(b) by 300 days.

(21) Appl. No.: 13/378,914

(22) PCT Filed: Jul. 7, 2010

(86) PCT No.: PCT/CH2010/000174
§ 371 (c)(1),
(2), (4) Date: Dec. 16, 2011

(87) PCT Pub. No.: WO2011/009223
PCT Pub. Date: Jan. 27, 2011

(65) Prior Publication Data
US 2012/0090168 A1 Apr. 19, 2012

(30) Foreign Application Priority Data
Jul. 22, 2009 (CH) ........................................ 1152/09

(51) Int. Cl.
*G01L 1/22* (2006.01)

(52) U.S. Cl.
USPC ............................................. 73/862; 73/818

(58) Field of Classification Search
USPC ................... 73/760, 862, 818, 777
See application file for complete search history.

(56) References Cited

U.S. PATENT DOCUMENTS

| 4,110,577 A | * | 8/1978 | Spisak ........................... 219/101 |
| 4,501,583 A | * | 2/1985 | Troutner ........................ 604/118 |
| 4,849,767 A | * | 7/1989 | Naitou ........................... 343/745 |
| 6,435,082 B1 | | 8/2002 | Habara |
| 7,467,723 B2 | * | 12/2008 | Zaguroli, Jr. .................. 212/331 |
| 7,843,158 B2 | * | 11/2010 | Prisco ............................ 318/566 |
| 8,281,670 B2 | * | 10/2012 | Larkin et al. ............. 73/862.045 |
| 2003/0223844 A1 | * | 12/2003 | Schiele et al. ..................... 414/5 |
| 2005/0131390 A1 | * | 6/2005 | Heinrich et al. .................. 606/1 |
| 2005/0257624 A1 | | 11/2005 | Dung |

FOREIGN PATENT DOCUMENTS

| DE | 19721072 A1 | 11/1997 |
| DE | 10251387 A1 | 6/2004 |
| DE | 102006030218 A1 | 1/2008 |
| EP | 1057586 A | 12/2000 |
| GB | 2274928 A | 8/1994 |
| WO | WO 02/23147 | 3/2002 |
| WO | WO 2004025202 A1 | 3/2004 |

OTHER PUBLICATIONS

International Search Report on Patentability, issued Sep. 23, 2010.
International Search Report on Patentability, issued Feb. 7, 2012.

* cited by examiner

*Primary Examiner* — Max Noori
(74) *Attorney, Agent, or Firm* — Dority & Manning, P.A.

(57) ABSTRACT

An electromechanical joining module for applying a linear force to a joining element, includes a stator, which represents the stationary part of the joining module, a tappet, which can be linearly extended out of the stator and which has an outer tappet end, and a force transducer for detecting forces that are applied to the joining element during the operation of the tappet end. The force transducer is attached in the area of the tappet end and has sensor electronics for wirelessly transmitting measurement data by means of near-field and far-field telemetry.

13 Claims, 2 Drawing Sheets

ELECTROMECHANICAL JOINING MODULE HAVING A FORCE TRANSDUCER

CROSS-REFERENCE TO RELATED APPLICATIONS

This application claims priority to International Application Ser. No. PCT/CH2010/000174 filed Jul. 7, 2010, which claims priority to Swiss Application No. CH 1152/09 filed Jul. 22, 2009.

TECHNICAL FIELD

The invention relates to an electromechanical joining module for applying a linear force onto a joining body, comprising a stator, which constitutes the fixed part of the joining module, a tappet, which can be linearly extended out of the stator, with an outer tappet end and also a force sensor for detecting forces which are applied onto the joining body during operation by the tappet end.

BACKGROUND

Electromechanical joining modules are electric motors which apply a linearly directed force onto a joining body by means of a tappet. Joining modules for assembly processes in which positive connections are produced are disseminated in particular. A joining module of this type is known for example from DE 19721072. This document does not discuss force measurements, however.

Joining modules of this type sometimes have force measuring apparatuses which measure force applied by the joining module onto a joining body. Measurement data captured in this manner are used for controlling the processes and/or for quality monitoring.

In the known joining modules, the force is for the most part detected in the housing of the joining module. In this case, the precision is limited due to the bearing friction, force shunts and also the sluggish mass of the moved parts. Alternatively, a force sensor can be integrated on the joining body. The cable connection to the force sensor is mechanically complex however and susceptible to faults and the lifetime of this cable connection is severely limited.

A tool for shaping, stamping and injection moulding technology, in which a force sensor is embedded in the functional surface of the tool, is known from EP 1057586. This is suitable for determining wear parameters on the tool, but not for measuring the force when joining as a whole. To this end, it should especially be avoided that the sensor is part of the functional surface, in order to prevent measurement errors due to local inhomogeneities. In addition, this document does not describe any actuator technology through which the tool moves and through which force is applied onto the tool. Thus, how the measurement data are transmitted from a joining body to a stator moving linearly thereto is also not described.

In DE 10251387, a press device, which has a torque sensor, is described. For this, the movement between the moveable part and the stationary part is a rotation, as a result of which the distance between both components remains virtually constant. This is a typical joining module as has been known for a long time. The force on the tool is determined using the torque sensor indirectly via the spindle pitch. Unknown variable friction forces of the spindle lead to relatively large measurement errors. As the sensor does not move translationally, a telemetric transmission of the measurement data is not a problem.

OBJECTS AND SUMMARY OF INVENTION

It is the object of the present invention to specify an electromechanical joining module of the type specified at the beginning, in which force measurements of the tappet forces can be carried out with improved precision, whereby the measuring device should be designed for a long life and can resist a large number of movement cycles undamaged and without a reduction in quality. In addition, the joining module should have a simple structure and be low maintenance, and also enable customer-specific adaptations without additional outlay.

The object is achieved in that the force sensor is attached in the region of the tappet end and has sensor electronics for the wireless transmission of measurement data by means of near-field or far-field telemetry.

For transmitting using near-field telemetry, according to the invention, the sensor electronics are connected to a tappet coil which extends over the entire extendible region of the tappet. Close to the tappet coil, the stator has stator electronics for wirelessly supplying the sensor electronics with power and for receiving the measurement data by means of near-field telemetry.

One of the advantages of a joining module according to the invention is the high precision of the force measurement which can be carried out therewith, as no error influences can act by means of bearing friction, force shunts and sluggish mass. The force measurement system is maintenance-free and the lifetime is substantially independent of the number of load cycles.

In particular, this arrangement is simple to realise and can also be used in an environment where far-field telemetry could cause problems due to radiation contamination of the environment. Both solutions offer the advantage, however, that no disruptive cables, which at most could be damaged, are in the way and that the forces are accommodated in an unaltered manner in the region of the tappet end, close to the force developing surfaces, without force shunts.

BRIEF DESCRIPTION OF THE DRAWINGS

In the following, the invention is explained in more detail with reference to the drawings. In the figures FIG. 1 shows a schematic side view of a joining module according to the invention in (a) the retracted state and (b) in the extended state;

DETAILED DESCRIPTION OF EXEMPLARY EMBODIMENTS

Figures 1A, 1B, 2:
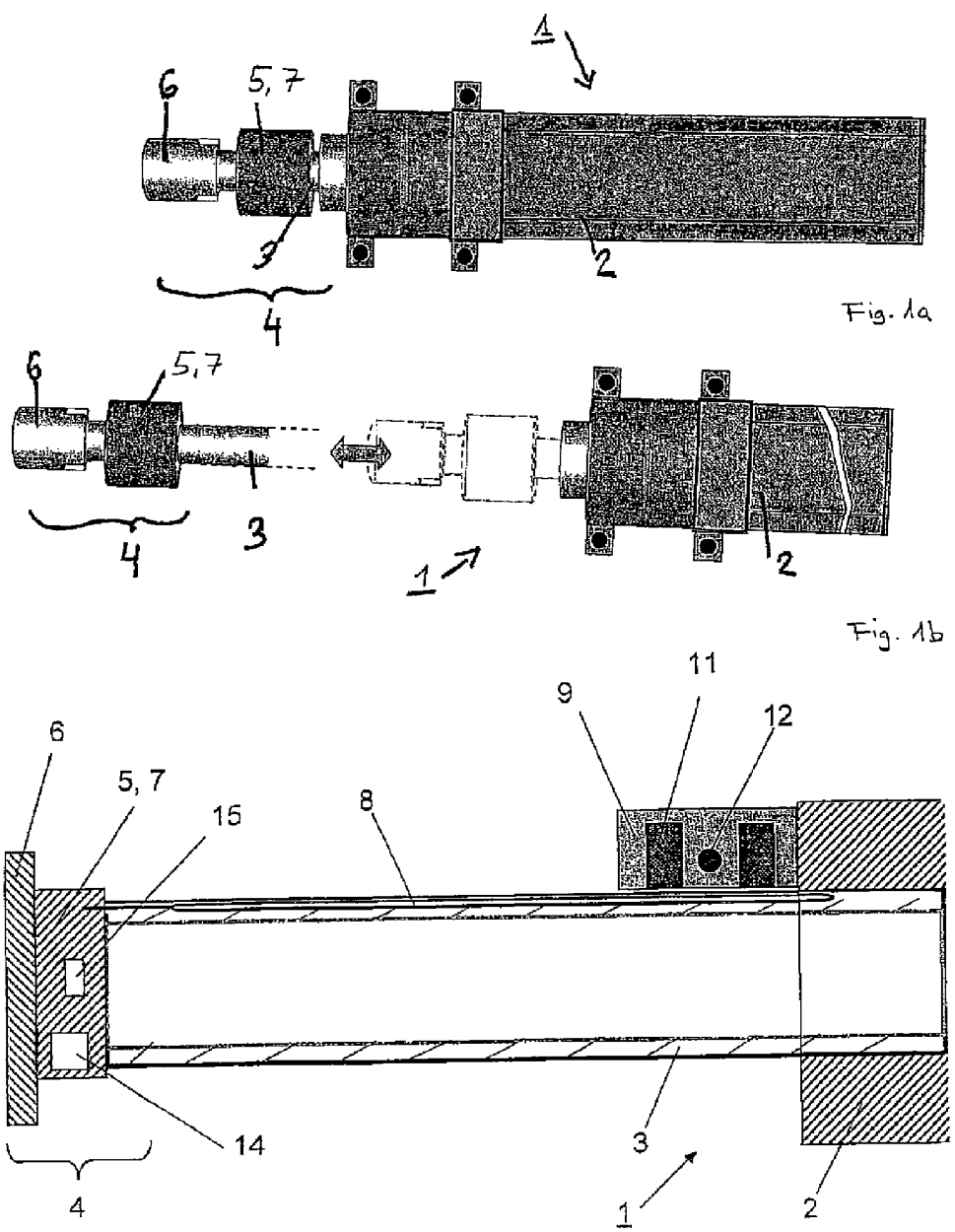
FIG. 2 shows a schematic illustration according to the invention of the joining module in the region of the tappet in the extended state.

The FIG. 1 shows an electromechanical joining module 1 comprising a stator 2 which constitutes a fixed part of the joining module 1 and a tappet 3 which can be moved in a linear direction out of the stator 2. FIG. 1a shows the joining module 1 in the retracted state, FIG. 1b in a state with extended tappet 3.

The tappet 3 has an outer end 4 on which a tool receptacle 6 can be attached. According to the invention, a force sensor 5, which can measure the force which acts from the tappet end 4 during use, is located in the region of the tappet end 4. This force sensor 5 has sensor electronics 7 for the wireless transmission of measurement data by means of near-field or far-field telemetry.

In the following, the transmission by means of near-field telemetry is described in FIGS. 2-5.

FIG. 2 shows an extended tappet 3 in a stator 2 of the joining module 1 with force sensor 5 which is attached on the tappet end 4 according to the invention, between tool receptacle 6 and tappet 3 in this illustration.

Figure 5:
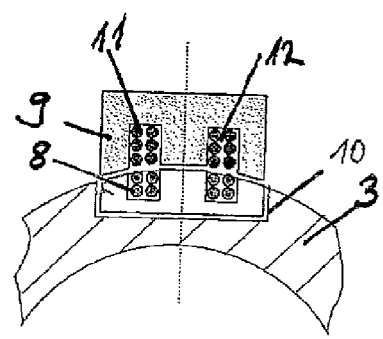
FIG. 5 shows a detailed view of FIG. 4 in the region of tappet coil, supply coil and receiving coil.

According to the invention, the force sensor 5 has sensor electronics 7 for wireless transmission of measurement data by means of near-field telemetry. These sensor electronics 7 are connected to a tappet coil 8 which extends over the entire extendible region of the tappet 3. Preferably, as shown in FIGS. 3b and 5 for example, this tappet coil 8 is arranged in a groove 10 in the tappet 3. Close to the tappet coil 8, the stator 2 has stator electronics 9 for wirelessly supplying the sensor electronics 7 with power and for receiving the measurement data by means of near-field telemetry.

In this arrangement according to the invention, these stator electronics 9 comprise one or a plurality of supply coils 11 which can generate a magnet alternating field. Thus, a voltage is induced in the tappet coil 8, as a result of which the sensor electronics 7 are supplied with power. In addition, in this manner, sensor relevant data can also be sent to the sensor electronics 7 which are used for measurement by means of the force sensor 5, such as for example the sensitivity of the sensor. It is advantageous in this connection if the sensor electronics 7 comprise a data memory 14 for storing such measurement-relevant data.

In addition, the stator electronics 9 have a receiving coil or a receiving antenna 12 for receiving captured measurement values and/or further information such as the status of the sensor electronics, measurement range, scale information and/or calibration data.

Figure 3A:
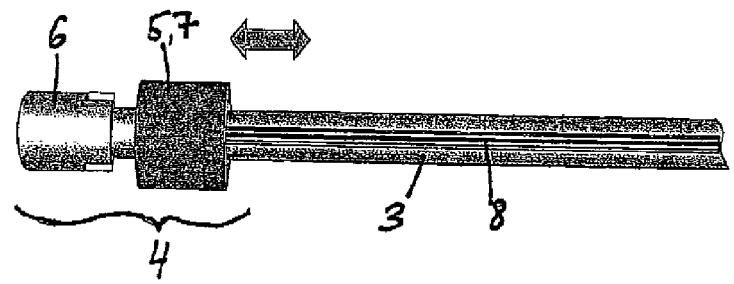
FIG. 3 shows an illustration of the tappet according to the invention (a) with tappet coil and (b) a detailed view of the tappet coil.
Figure 3B:
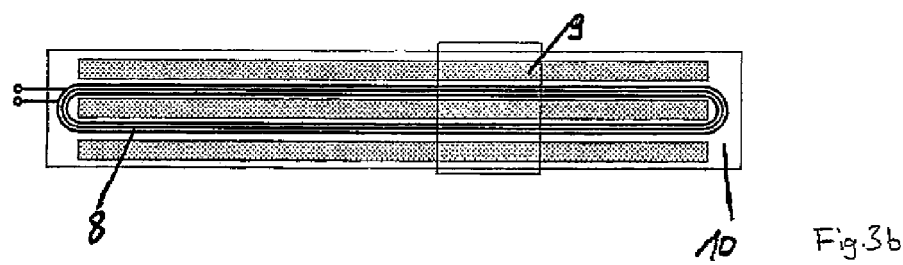

FIG. 3a shows a tappet 3 according to the invention with tappet coil 8, whereby FIG. 3b shows the tappet coil 8 arranged in the groove 10 in a more detailed illustration. In this illustration in FIG. 3b, the stator electronics 9 are illustrated in a central region of the tappet 3 overlapping the tappet coil 8.

Figure 4:
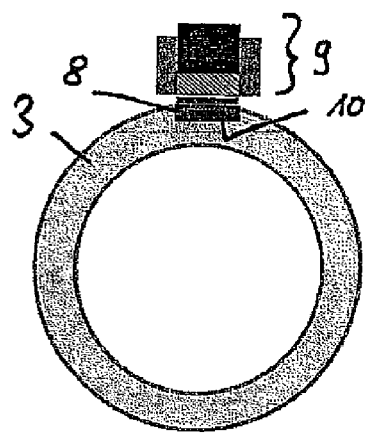
FIG. 4 shows a cross section of the tappet in the region of the stator electronics.

FIG. 4 shows a cross section of the tappet 3 in the region of the stator electronics 9. It can be seen from this illustration that the stator electronics 9 with the stator supply coil(s) 11 are arranged close to the tappet coil 8 independently of the tappet position. FIG. 5 is a detailed view of FIG. 4 in the region of the coils. The illustration shows the closely opposite, contactlessly arranged primary and secondary windings, namely the stator supply coil 11 and the receiving coil 12 as primary windings and the tappet coil 8 on the tappet 3 as secondary winding.

It has proven advantageous to transmit the measurement values by electromagnetic coupling via a modulated carrier by means of phase modulation (PSK modulation) from the tappet coil 8 to the receiving coil 12, a carrier of approx. 13.56 MHz or approx. 27.1 MHz being used. In addition to the measurement values, further status information can be transmitted from the sensor electronics 9 to the stator 2, such as information about the force sensor, measurement ranges, scale information, calibration data, etc. The data are preferably transmitted in a digitised manner.

A carrier frequency of 119 to 135 kHz is used for the power transmission. The signals for the energy transmission can also be modulated in order to transmit control information to the sensor electronics 9. A phase modulation (PSK modulation) is likewise used as modulation method. To adapt the transmitted power, the carrier frequency is changed at the stator in the range from 119 to 135 kHz.

In a preferred configuration, the force sensor 5 is a piezoelectric force sensor.

In particular, as shown in FIG. 2 for example the joining module 1 according to the invention can additionally have a path sensor 15 for detecting a tappet path or a tappet position. During use, this can for example determine the distance to a joining body onto which the joining module exerts a force. The path sensor 15 can preferably be an incremental, inductive or optical sensor.

Alternatively to near-field telemetry, the joining module 1 according to the invention can be provided with sensor electronics 7 which have a transmission module for transmitting the measurement data by means of far-field telemetry. In this case, the sensor electronics 7 can comprise a rechargeable battery. This rechargeable battery can for example likewise be charged from the stator, for example if the tappet 3 is completely retracted, by means of contacts correspondingly attached thereto. A regular exchange of the rechargeable battery would also be possible. The advantage of such an arrangement is that the measurement data can be sent directly to an analysis unit at any desired location for further processing and/or for controlling the joining module 1, without it being necessary to forward measurement data from the same to a control unit.

Reference List

1 Joining module
2 Stator
3 Tappet
4 Tappet end
5 Force sensor
6 Tool receptacle
7 Sensor electronics
8 Tappet coil
9 Stator electronics
10 Groove
11 Supply coil
12 Receiving coil or receiving antenna
14 Data memory
15 Path sensor

The invention claimed is:

1. Electromechanical joining module for applying a linear force onto a joining body, comprising a stator, which constitutes the fixed part of the joining module, a tappet, which can be linearly extended out of the stator, with an outer tappet end and also a force sensor for detecting forces which are applied onto the joining body during operation by the tappet end, wherein the force sensor is attached in the region of the tappet end and has sensor electronics for the wireless transmission of measurement data by means of near-field or far-field telemetry.

2. Joining module according to claim 1, wherein the force sensor is a piezoelectric force sensor or comprises a strain gauge.

3. Joining module according to claim 1, wherein the sensor electronics comprise a data memory for storing measurement-relevant data.

4. Joining module according to claim 1, comprising a path sensor for detecting a tappet path or a tappet position.

5. Joining module according to claim 4, wherein during use, the path sensor can determine the distance to a joining body onto which the joining module exerts a force.

6. Joining module according to claim 4, wherein the path sensor is an incremental, inductive or optical sensor.

7. Joining module according to claim 1, further comprising a tappet coil which extends over the entire extendible region of the tappet and is connected to the sensor electronics, wherein close to the tappet coil, the stator has stator electronics for wirelessly supplying the sensor electronics with power and for receiving the measurement data by means of near-field telemetry.

8. Joining module according to claim 7, wherein the tappet coil is arranged in a groove in the tappet.

9. Joining module according to claim 7, wherein the stator electronics comprise at least one supply coil which can generate a magnet alternating field for inducing a voltage in the tappet coil for supplying power to the sensor electronics.

10. Joining module according to claim 7, wherein the stator electronics have a receiving coil or a receiving antenna for receiving captured measurement values.

11. Joining module according to claim 1, wherein the sensor electronics have a transmission module for transmitting the measurement data by means of far-field telemetry.

12. Joining module according to claim 11, wherein the sensor electronics comprise a rechargeable battery.

13. Joining module according to claim 7, wherein the stator electronics have a receiving coil or a receiving antenna for receiving captured measurement values and at least one of the following types of further information: the status of the sensor electronics, measurement range, scale information and calibration data.

\* \* \* \* \*